United States Patent [19]
Helton

[11] Patent Number: 5,869,840
[45] Date of Patent: Feb. 9, 1999

[54] HAND-HELD, DUAL-MODE BARCODE SCANNER WITH LIGHT-ACTIVATED SWITCH

[75] Inventor: Patrick Helton, Marysville, Wash.

[73] Assignee: Intermec Corporation, Everett, Wash.

[21] Appl. No.: 581,826

[22] Filed: Jan. 2, 1996

[51] Int. Cl.[6] .................................................. G06K 7/10
[52] U.S. Cl. .......................................... 235/472; 250/221
[58] Field of Search .......................... 235/472; 250/221, 250/227.22, 214 SW, 338.1; 315/159; 4/304, 623; 340/573–576; 362/113; 400/479.2; 446/175

[56] References Cited

U.S. PATENT DOCUMENTS

| | | | |
|---|---|---|---|
| 4,329,581 | 5/1982 | Helfrich, Jr. et al. | 250/227.22 |
| 4,937,443 | 6/1990 | Smoot | 250/221 |
| 4,972,070 | 11/1990 | Laverty, Jr. | 250/221 |
| 5,086,526 | 2/1992 | Van Marcke | 4/623 |
| 5,315,097 | 5/1994 | Collins, Jr. et al. | 235/472 |
| 5,340,973 | 8/1994 | Knoeles et al. | 235/472 |
| 5,576,531 | 11/1996 | Murphy | 235/472 |
| 5,637,863 | 6/1997 | Sanborn et al. | 250/221 |
| 5,646,596 | 7/1997 | Gumm | 250/221 |

FOREIGN PATENT DOCUMENTS 62-147578  7/1987  Japan .................................. 235/472

*Primary Examiner*—F. L. Evans
*Attorney, Agent, or Firm*—Donald A. Streck; Joan H. Pauly

[57] ABSTRACT

A hand-held, dual-mode barcode scanner for two dimensional barcodes. A supplemental switch activatable by the user changes the function being performed by the scanner. In one implementation, the barcode data is used to reprogram the scanner's logic when the supplemental switch is activated. The preferred embodiment employs a light-activated switch that is turned on by the user placing his/her finger/thumb over an opening in the scanner case. An infrared-activated version of the switch is also shown.

36 Claims, 6 Drawing Sheets

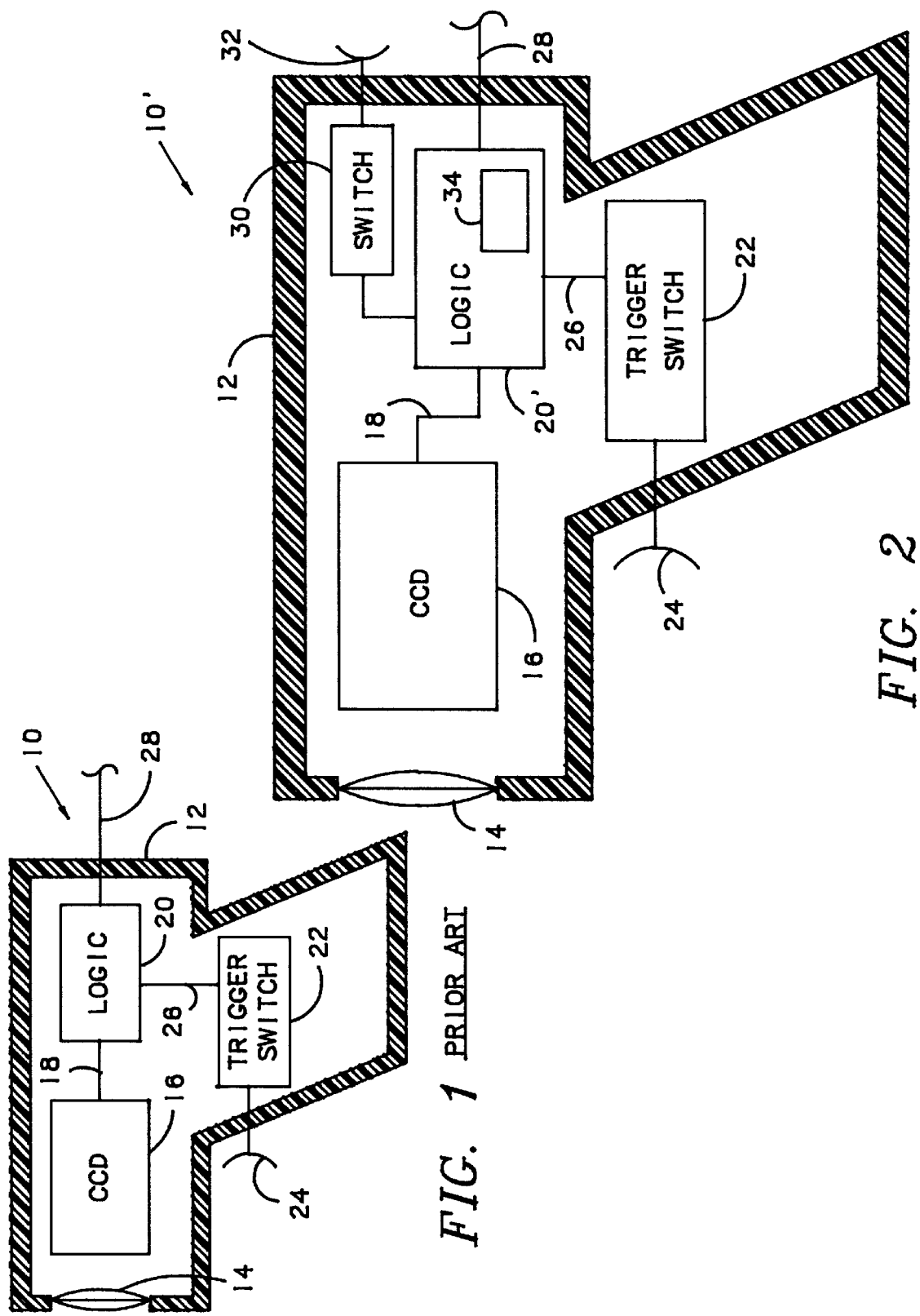

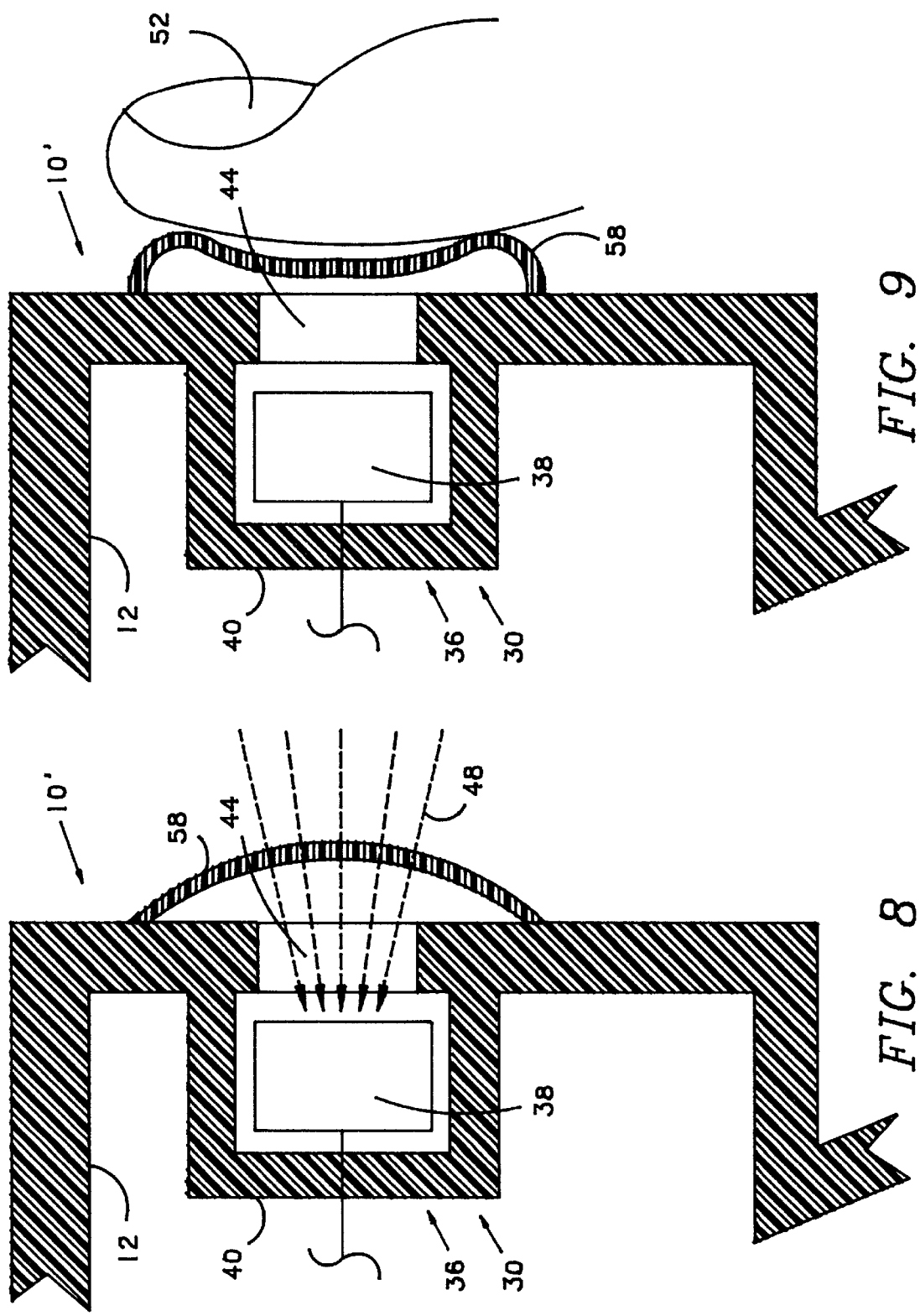

HAND-HELD, DUAL-MODE BARCODE SCANNER WITH LIGHT-ACTIVATED SWITCH

BACKGROUND OF THE INVENTION

1. Technical Field

This invention relates to hand-held barcode scanners and, more particularly, to a hand-held, dual-mode barcode scanner comprising, a hollow case sized and shaped to be held in a user's hand; apparatus for scanning a barcode disposed within the case and having an output outputting a signal representing data contained in a scanned barcode; a supplemental switch disposed within the case manually activatable by a user; and, logic disposed within the case connected to the apparatus for scanning a barcode and the supplemental switch for taking a first action when the supplemental switch is not activated by a user and for taking a second action when the supplemental switch is activated by a user.

2. Background Art

Most barcode scanners in use today are meant to read and decode one dimensional barcodes. A light beam is scanned across the barcode and reflected light as modulated by the light and dark bands of the barcode produces a signal which is then decoded to determine the data encoded into the barcode.

Linear or one dimensional barcodes are limited in the amount of information they can hold by the physical area available. On the side of a railroad boxcar or a large carton, a large barcode can be employed to contain a large amount of data. On the other hand, while the ability to miniaturize linear barcodes has increased, data requirements vis-a-vis the available areas to mark micro-electronic components with barcode-encoded data have virtually mandated a new approach. Thus, there is a rapidly emerging technology in two dimensional barcodes.

A typical prior art two dimensional barcode reader is depicted in simplified form in FIG. 1 where it is generally indicated as 10. The barcode reader 10 has a hand-held case 12 of so-called "pistol-grip" shape containing the components required to scan a two dimensional barcode. There is a lens system 14 which focuses a field of view (not shown) containing a barcode on a charge coupled device (CCD) 16. The CCD is, of course, an element that is commonly used in video cameras. The CCD constantly outputs a signal on line 18 containing the two dimensional pixel data of what is being "seen" by the lens system 14. In the barcode reader 10, the output line 18 is input to the logic 20. There is also a trigger switch 22 which is operated by manually depressing the trigger button 24. The trigger switch 22 is also connected to the logic 20 by line 26. The signal out of the barcode reader 10 appears on line 28 from the logic 20. This is, of course, a greatly simplified depiction and the logic 20, for example, can be structured to completely analyze the output from the CCD 16 or merely pass it on for decoding by other logic connected to line 28.

In use, the barcode reader 10 is pointed at a barcode at its focal point by means not important to the present invention. Then the barcode is in focus, the trigger button 24 is pressed causing the logic 20 to snapshot or freeze the then output data on line 18. That snapshot of data can then be analyzed according to techniques which also form no part of the present invention and, for that reason, will not be addressed in any detail herein in the interest of simplicity and the avoidance of redundancy. According to one aspect of such barcode readers as being developed by the assignee of this application, the logic 20 analyzes the barcodes read to see if it is a data barcode or a reader reprogramming barcode. Thus, there must be uniquely recognizable reprogramming barcodes and the logic 20 must be able to recognize them. By that arrangement, the barcode reader 10 can be reprogrammed to recognize and decode a particular type of barcode from several possibilities by first having it scan a reprogramming barcode associated with the barcode type to be recognized.

In another aspect of such prior art barcode readers, there may be a pattern of actions taken each time that a particular user may wish to avoid as overly time consuming or redundant under particular circumstances. For example, if the hand-held barcode reader 10 is placed in a solid mount at the focal distance from barcodes to be scanned, there is no need for the barcode reader 10 to go through the prescanning process of guiding the user to the focal distance. In such cases, it would be desirable for the user to be able to deactivate that feature from the reader 10.

Wherefore, it is an object of the present invention to provide a hand-held barcode reader wherein the functions thereof can be modified upon demand by a user.

It is another object of the present invention to provide a hand-held barcode reader having a supplemental switch for changing the functions of the reader.

It is still another object of the present invention to provide a hand-held barcode reader with a finger-activated primary switch having a supplemental switch that is easily activated by a user's thumb without interfering with the activation of the primary switch.

It is yet another object of the present invention to provide a light-activated switch which can be incorporated into a hand-held barcode reader so as to be easily activated by a user's thumb blocking and unblocking a path of light thereto.

It is a still further object of the present invention to provide a light-activated switch which has a tactile feel.

Other objects and benefits of this invention will become apparent from the description which follows hereinafter when read in conjunction with the drawing figures which accompany it.

SUMMARY

The foregoing objects have been achieved by the hand-held, dual-mode barcode scanner of the present invention comprising, a hollow case sized and shaped to be held in a user's hand; apparatus for scanning a barcode disposed within the case and having an output outputting a signal representing data contained in a scanned barcode; a supplemental switch disposed within the case manually activatable by a user; and, logic disposed within the case connected to the apparatus for scanning a barcode and the supplemental switch for taking a first action when the supplemental switch is not activated by a user and for taking a second action when the supplemental switch is activated by a user.

In one embodiment, the first action comprises decoding the signal from the output as barcode data and he second action comprises decoding the signal from the output as reprogramming data.

In the preferred embodiment, the supplemental switch is positioned to be activated by a user's thumb or a finger when the case is being gripped for use.

In one disclosed embodiment, the supplemental switch includes a light-sensitive photodiode; and, the supplemental switch is operated by blocking and unblocking a path for light to strike the photodiode. In that embodiment, the path may include a lightpipe therein.

In another disclosed embodiment, the supplemental switch includes a infrared-sensitive detector; and, the supplemental switch is operated by placing and removing a source of infrared energy in a path to strike the infrared-sensitive detector. The envisioned source of infrared energy may be a user's thumb or a finger.

The objects of the invention are also separately achieved by a radiant energy-activated switch comprising, a hollow energy-sealed case having an opening in a sidewall thereof; and, a radiant energy-sensitive device having a radiant energy-sensitive surface and an output producing an electrical signal at the output when radiant energy is striking the radiant energy-sensitive surface, the radiant energy-sensitive device being disposed in the case with the radiant energy-sensitive surface being disposed to have radiant energy entering the opening strike it. The radiant energy may be light or infrared energy.

DESCRIPTION OF THE DRAWINGS

FIG. 1 is a simplified partial functional block diagram of a prior art hand-held barcode scanner.

FIG. 2 is an enlarged simplified partial functional block diagram of a dual-mode hand-held barcode scanner of a first type according to the present invention.

FIGS. 8 and 9 are greatly enlarged drawings of the rear of a barcode scanner employing the switch of FIGS. 4 and 5 modified to provide tactile feel to the user.

DESCRIPTION OF THE PREFERRED EMBODIMENT

The foregoing objects of the present invention have been achieved by the barcode reader 10' of FIG. 2 wherein like parts are designated by like numbers. A supplemental switch 30 is contained within the case 12 and connected to the logic 20'. For user convenience, the trigger button 24 is depressed by a user's index finger in the usual manner for pistol grip devices while the supplemental switch 30 is positioned so as to be activated by the user's thumb at 32 in a manner to be described in greater detail shortly.

Figure 3:
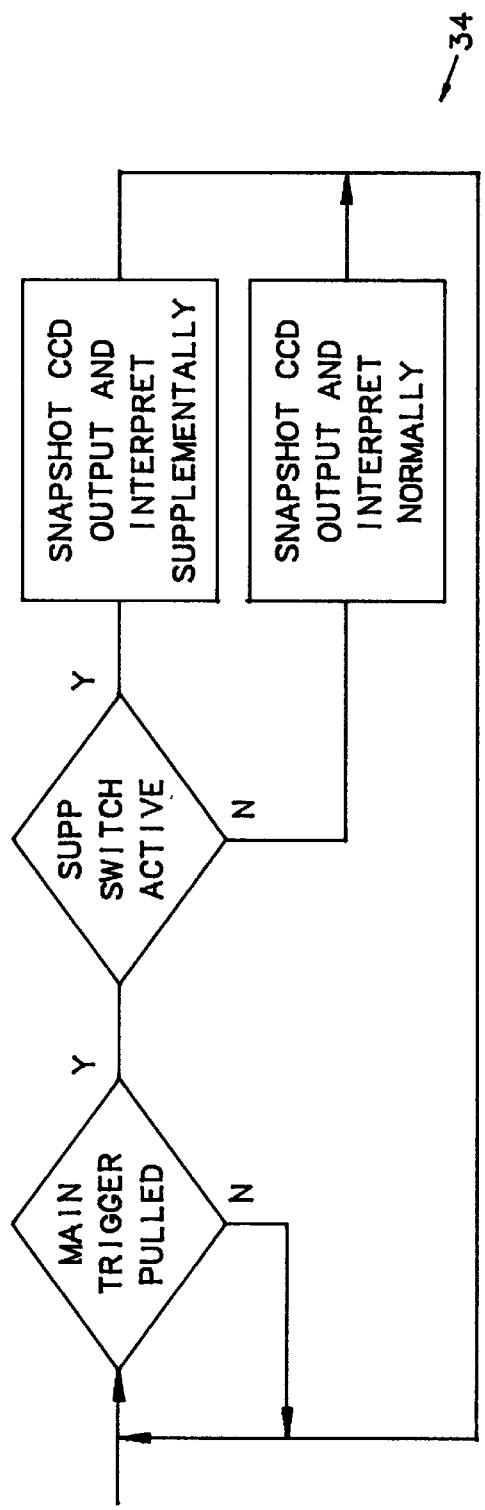
FIG. 3 is a flowchart of exemplary logic that can be employed in the scanner of FIG. 2.

To further attain the objects of the present invention, the logic 20' contains additional logic 34 such as that given by way of example in FIG. 3. As those of ordinary skill in the art will readily recognize and appreciate, the logic 34 is by way of example only and is not limiting in any way. The supplemental switch 30 can be employed in a variety of ways according to the desired features of the barcode reader 10'. As can be seen, the logic 34 is a loop function that watches to see if the main trigger button 24 has been depressed. When it has been depressed, the logic 34 then looks to see if the supplemental switch 30 has been activated by the user. If it has not, the CCD output 18 is snapshoted as described earlier and interpreted in a normal manner. If the supplemental switch 30 is active, the logic 34 takes an alternate path which, in this case, calls for the snapshoted CCD output 18 to be interpreted in a supplemental manner. That could be, for example, to interpret the barcode as a reprogramming barcode. That would, of course, cut down on the decode time for every barcode read by the barcode reader 10' since the logic 20' would not have to look for reprogramming barcodes as a decoding option. While not depicted in FIG. 3, the supplemental path of the logic 34 could also be to assist the user in focusing the barcode reader 10', or the like. While also not depicted in FIG. 3, the activation of the supplemental switch 30 could also be recognized independently of the primary switch 22—such non-depicted implementations, of course, being easily accomplished by those of ordinary skill in the art without undue experimentation.

Figure 5:
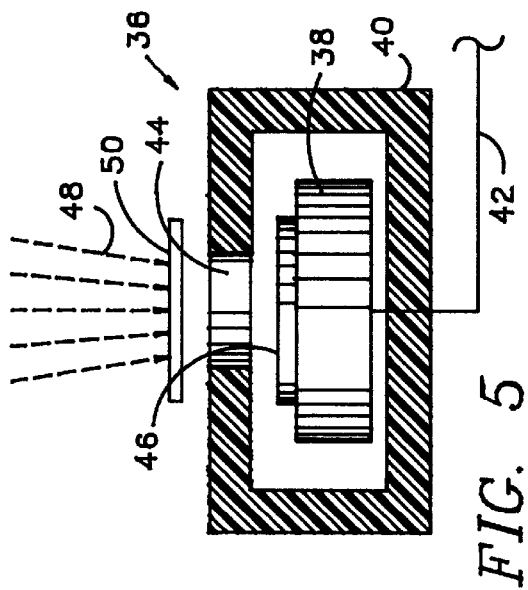
FIGS. 4 and 5 are cutaway drawings of a first embodiment of a radiant energy-activated switch as employed in the preferred embodiment of the present invention shown turned off and on, respectively.
Figure 4:
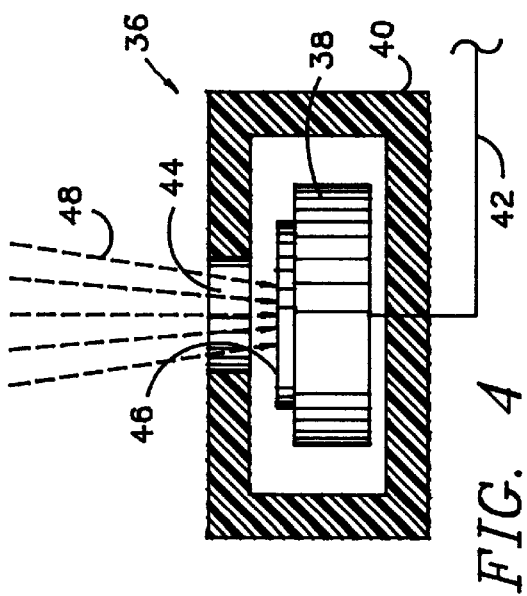

Turning now to FIGS. 4 and 5, a novel light-activated switch 36 according to another aspect of the present invention as intended for the preferred embodiment thereof is shown in simplified form as to its method of operation. A photodiode 38 or other light-activated device is mounted in a light-sealed case 40 and the signal output line 42 thereof brought from the case 40. An opening 44 is provided in the case 40 over the light sensing surface 46 of the photodiode 38 so as to allow ambient light 48 to enter the case 40 and strike the surface 46 as depicted in FIG. 4 thereby causing a signal to be output on line 42. The configuration of FIG. 4 with a signal present on line 42 represents the "off" status of the switch 36. The switch 36 is turned "on" as depicted in FIG. 5 by blocking the light 48 from entering the opening 44 as with a blocking member 50. Thus, the absence of a signal on line 42 represents the switch 36 being on.

Figures 6, 7:
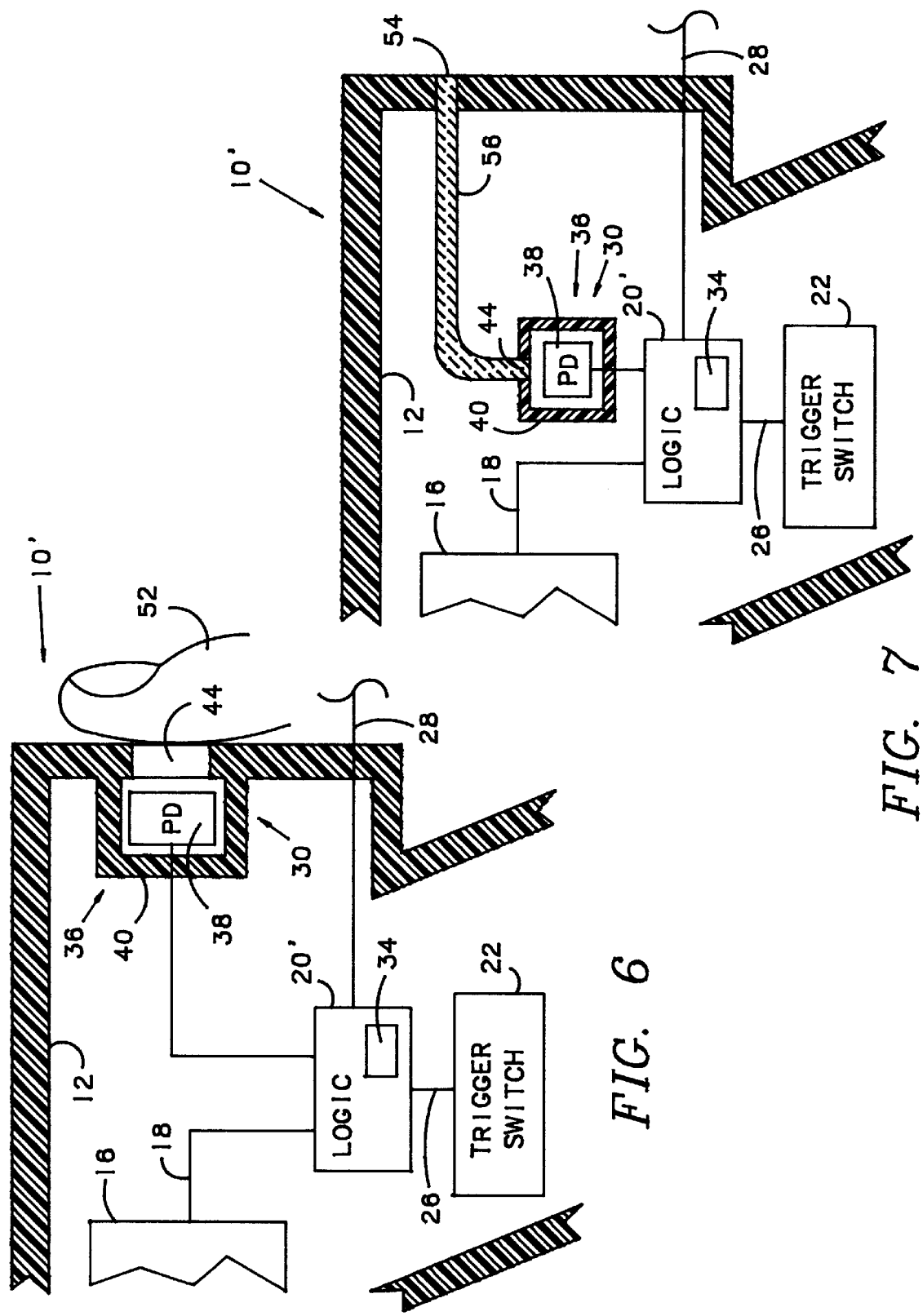
FIG. 6 is an enlarged, detailed, cutaway drawing of the rear of a barcode scanner according to the present invention employing the switch of FIGS. 4 and 5 in a first embodiment.
FIG. 7 is an enlarged, detailed, cutaway drawing of the rear of a barcode scanner according to the present invention employing the switch of FIGS. 4 and 5 in a second embodiment.

Two possible implementations of the switch 36 in a barcode reader 10' are depicted in FIGS. 6 and 7. In the embodiment of FIG. 6, the case 40 containing the to photodiode 38 is built into the case 12 of the reader 10' and the opening 44 is in the case 12 at a position convenient for covering by the thumb 52 of the user. In the embodiment of FIG. 7, the case 40 containing the photodiode 38 is contained separately within the case 12 of the reader 10' and the opening 44 in the case 40 is connected to an opening 54 in the case 12 at a position convenient for covering by the thumb 52 of the user by a light pipe 56 of any type well known to those of ordinary skill in the art such as, for example, a bundle of optic fibers.

As can be appreciated, while it is well suited for use in the barcode reader 10' of the present invention, the light-activated switch 36 of this invention can be employed to advantage in numerous applications. For some users and in some applications, the switch 36 of FIGS. 6 and 7 may need to have a tactile feel and/or an accompanying sound when activated. This can be accomplished as depicted in FIGS. 8 and 9. A transparent or translucent plastic dome 58 such as use in so-called "membrane" switches or the like is disposed over the opening 54. Light 48 passes through the dome 58 to strike the light sensing surface 46 of the photodiode 38 and place it in the "off" state. When the user's thumb 52 is pushed against the dome 58, the dome 58 "oilcans" to snap into the position of FIG. 9 giving an audible "click" and a tactile feel while moving the user's thumb 52 into position to close the opening 54 and turn the switch 36 "off".

Figure 10:
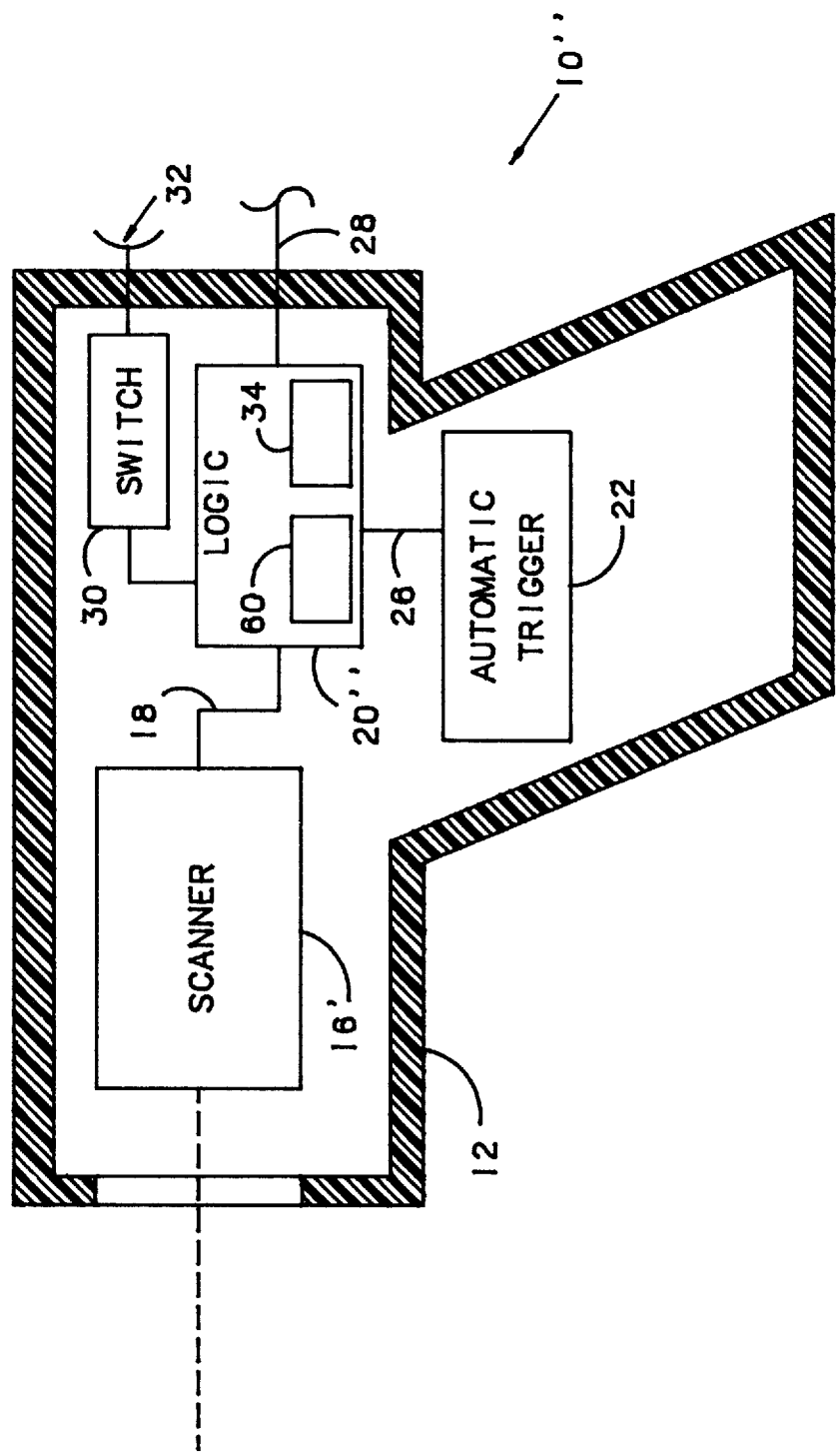
FIG. 10 is an enlarged simplified partial functional block diagram of a dual-mode hand-held barcode scanner of a second type according to the present invention.

The foregoing objects of the present invention can also be achieved in other working environments as typified by the barcode reader 10" of FIG. 10 wherein, again, like parts are designated by like numbers. In the reader 10", the CCD 16 has been replaced by a generic "scanner" 16' which can be of any type providing scan information to the logic 20" on the line 18. The logic 20" is a dual-mode logic containing a primary logic 60 as well as the additional logic 34. A "supplemental" switch 30 is again contained within the case 12 and connected to the logic 20". The manually activated switch 22, however, has been replaced by an automatic trigger 22' which may, in fact, be part of the logic 20". The point is that the supplemental switch 30 is supplemental to a switching function out of the control of the operator. But, the "supplemental" switch 30 is still supplemental in function as will be seen.

Figure 11:
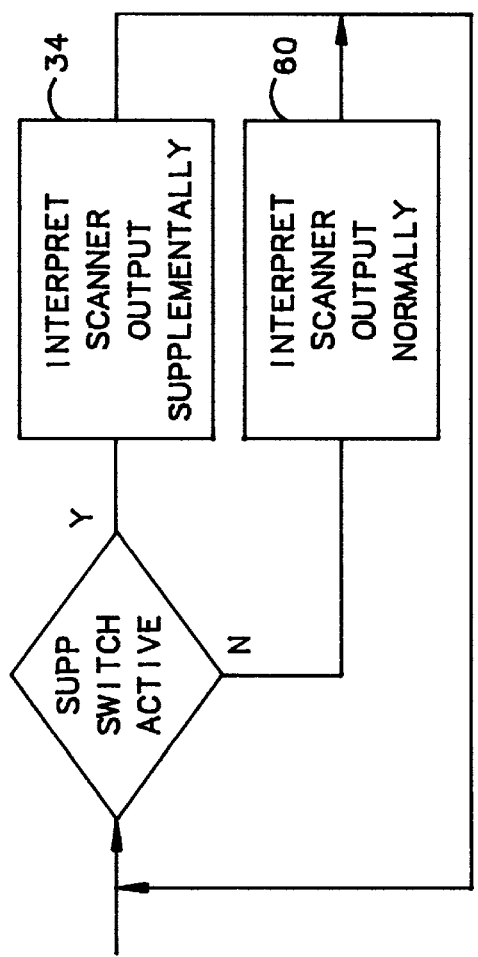
FIG. 11 is a flowchart of exemplary logic that can be employed in the scanner of FIG. 10.

To attain the objects of the present invention in this invention, the logic 20" contains logic such as that given by way of example in FIG. 11. As in the earlier case of FIG. 3, the logic of FIG. 11 is by way of example only and is not limiting in any way. The supplemental switch 30 can be employed in a variety of ways according to the desired features of the barcode reader 10". As can be seen, the logic 22" is a loop function that watches to see if the supplemental trigger "button" 32 has been depressed, i.e. if the supplemental switch 30 has been turned "on". When it has not, the scanner output 18 is interpreted in a normal manner as by the primary logic 60. If the supplemental switch 30 is active, the logic 22" takes an alternate path which, in this case, calls for the scanner output 18 to be interpreted in a supplemental manner as by the supplemental logic 34. In short, the logic 22" is a dual-mode logic which operates normally as long as the supplemental switch 30 is "off" and operates in an alternate mode when the supplemental switch 30 is "on".

Figure 13:
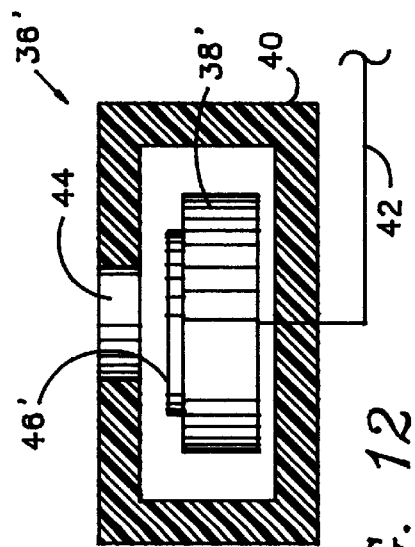
FIGS. 12 and 13 are cutaway drawings of a second embodiment of a radiant energy-activated switch as employed in the preferred embodiment of the present invention shown turned off and on, respectively.
Figure 12:
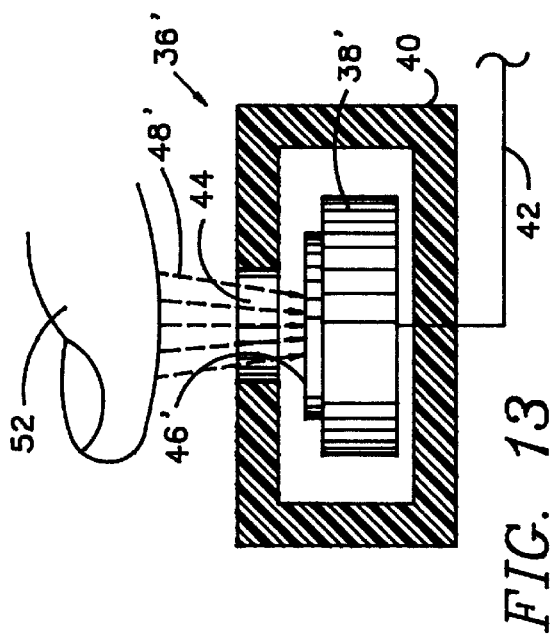

Turning now to FIGS. 12 and 13, a novel energy-activated switch 36' according to another aspect of the present invention is shown in simplified form as to its method of operation. An infrared (IR) activated photodiode 38' or other IR-activated device is mounted in a light-sealed case 40 and the signal output line 42 thereof brought from the case 40. An opening 44 is provided in the case 40 over the IR-sensing surface 46' of the photodiode 38'. The configuration of FIG. 12 with no signal present on line 42 represents the "off" status of the switch 36'. The switch 36' is turned "on" as depicted in FIG. 13 by placing a finger 52 or other IR-emitting object over the opening 44 so as to allow IR energy 48' to enter the case 40 and strike the surface 46' as depicted in FIG. 13 thereby causing a signal to be output Wherefore, having thus described the present invention, I claim:

1. A hand-held, dual-mode barcode scanning device comprising:
   a) a hollow case sized and shaped to be held in a user's hand;
   b) a scanner disposed within said case in a position for scanning barcodes, said scanner having an output outputting a signal representing data contained in a scanned barcode;
   c) a primary switch disposed within said case connected to said scanner, said switch being manually activatable by a user while gripping said case to initiate a scanning process;
   d) a secondary switch disposed within said case manually activatable by a user while gripping said case and activating said primary switch; and
   e) logic disposed within said case connected to said scanner, said primary switch, and said secondary switch for taking a first action when said primary switch is activated by a user but said secondary switch is not activated and for taking a second action when both said primary switch and said secondary switch are activated by a user, said first action comprising interpreting said signal in a first manner, and said second action comprising interpreting said signal in a second manner.

2. The hand-held, dual-mode barcode scanning device of claim 1 wherein:
   said first action comprises decoding said signal from said output as barcode data.

3. The hand-held, dual-mode barcode scanning device of claim 1 wherein:
   said second action comprises decoding said signal from said output as reprogramming data.

4. The hand-held, dual-mode barcode scanning device of claim 1 wherein:
   said primary switch is positioned to be activated by a user's finger.

5. The hand-held, dual-mode barcode scanning device of claim 1 wherein:
   said secondary switch is positioned to be activated by a user's thumb.

6. The hand-held, dual-mode barcode scanning device of claim 1 wherein:
   a) said secondary switch includes a photodiode; and,
   b) said secondary switch is operated by blocking and unblocking a path for light to strike said photodiode.

7. The hand-held, dual-mode barcode scanning device of claim 6 wherein:
   said path includes a lightpipe therein.

8. The hand-held, dual-mode barcode scanning device of claim 2 wherein said second action comprises decoding said signal from said output as reprogramming data.

9. The hand-held, dual-mode barcode scanning device of claim 4 wherein said secondary switch is positioned to be activated by a user's thumb.

10. A light-activated switch comprising:
    a) a hollow light-sealed case having an opening in a sidewall thereof;
    b) a photosensitive device having a light sensitive surface and an output producing an electrical signal at said output when light is striking said sensitive surface, said photosensitive device being disposed in said case with said sensitive surface being disposed to have light entering said opening strike it whereby said switch is "off" when said electrical signal is present on said output and said switch is "on" when said opening is blocked and said electrical signal is absent on said output; and
    c) a light-passing plastic dome disposed over said opening which oilcans when depressed to provide a tactile feel to a user as it moves to a collapsed position blocking light from entering said opening.

11. The light-activated switch of claim 10 and additionally comprising:
    a light path disposed between said opening and a switch activation opening through which light can enter whereby said switch is turned off and on by unblocking and blocking said switch activation opening respectively.

12. A hand-held, dual-mode, two dimensional barcode scanning device comprising:
   a) a hollow case sized and shaped to be held in a user's hand;
   b) a charge coupled device disposed within said case positioned to view two dimensional barcodes at a focal point thereof and having an output outputting a signal representing data contained in a two dimensional barcode being viewed;
   c) a primary switch disposed within said case connected to said charge coupled device, said switch being manually activatable by a user while gripping said case to initiate a process of scanning a two dimensional barcode;
   d) a secondary switch disposed within said case manually activatable by a user while gripping said case and activating said primary switch; and
   e) logic disposed within said case connected to said output of said charge coupled device, said primary switch, and said secondary switch for snapshotting said data on said output and taking a first action when said primary switch is activated by a user but said secondary switch is not activated and for taking a second action when both said primary switch and said secondary switch are activated by a user, said first action comprising interpreting said signal in a first manner, and said second action comprising interpreting said signal in a second manner.

13. The hand-held, dual-mode, two dimensional barcode scanning device of claim 12 wherein:
   said first action comprises decoding snapshotted data from said output as two dimensional barcode data.

14. The hand-held, dual-mode, two dimensional barcode scanning device of claim 12 wherein:
   said second action comprises decoding snapshotted data from said output as reprogramming data.

15. The hand-held, dual-mode, two dimensional barcode scanning device of claim 12 wherein:
   said primary switch is positioned to be activated by a user's finger.

16. The hand-held, dual-mode, two dimensional barcode scanning device of claim 12 wherein:
   said secondary switch is positioned to be activated by a user's thumb.

17. The hand-held, dual-mode, two dimensional barcode scanning device of claim 12 wherein:
   a) said secondary switch includes a photodiode; and,
   b) said secondary switch is operated by blocking and unblocking a path for light to strike said photodiode.

18. The hand-held, dual-mode, two dimensional barcode scanning device of claim 17 wherein:
   said path includes a lightpipe therein.

19. The hand-held, dual-mode, two dimensional barcode scanning device of claim 13, wherein said second action comprises decoding snapshotted data from said output as reprogramming data.

20. The hand-held, dual-mode, two dimensional barcode scanning device of claim 15, wherein said secondary switch is positioned to be activated by a user's thumb.

21. The hand-held, dual-mode, two dimensional barcode scanning device of claim 20, wherein:
   (a) said secondary switch includes a photodiode; and
   (b) said secondary switch is operated by blocking and unblocking a path for light to strike said photodiode.

22. A hand-held, dual-mode barcode scanning device comprising:
   a) a hollow case sized and shaped to be held in a user's hand;
   b) a scanner disposed within said case in a position for scanning barcodes, said scanning device having an output outputting a signal representing data contained in a scanned barcode;
   c) a supplemental switch disposed within said case manually activatable by a user; and
   d) logic disposed within said case connected to said scanner and said supplemental switch for taking a first action when said supplemental switch is not activated by a user and for taking a second action when said supplemental switch is activated by a user, said first action comprising interpreting said signal in a first manner, and said second action comprising interpreting said signal in a second manner.

23. The hand-held, dual-mode barcode scanning device of claim 22 wherein:
   said first action comprises decoding said signal from said output as barcode data.

24. The hand-held, dual-mode barcode scanning device of claim 22 wherein:
   said second action comprises decoding said signal from said output as reprogramming data.

25. The hand-held, dual-mode barcode scanning device of claim 22 wherein:
   said supplemental switch is positioned to be activated by a user's thumb/finger.

26. The hand-held, dual-mode barcode scanning device of claim 22 wherein:
   a) said supplemental switch includes a light-sensitive photodiode; and,
   b) said supplemental switch is operated by blocking and unblocking a path for light to strike said photodiode.

27. The hand-held, dual-mode barcode scanning device of claim 26 wherein:
   said path includes a lightpipe therein.

28. The hand-held, dual-mode barcode scanning device of claim 22 wherein:
   a) said supplemental switch includes an infrared-sensitive detector; and,
   b) said supplemental switch is operated by placing and removing a source of infrared energy in a path to strike said infrared-sensitive detector.

29. The hand-held, dual-mode barcode scanning device of claim 23, wherein said second action comprises decoding said signal from said output as reprogramming data.

30. A hand-held, dual-mode, two dimensional barcode scanning device comprising:
   a) a hollow case sized and shaped to be held in a user's hand;
   b) scanning means disposed within said case and positioned for viewing two dimensional barcodes, said scanning means having an output for outputting a signal representing data contained in a two dimensional barcode being viewed;
   c) primary switching means disposed within said case for causing said scanning means to view a two dimensional barcode and output said signal;
   d) supplemental switching means disposed within said case for manual activation by a user while gripping said case; and
   e) logic disposed within said case connected to said output of said scanning means, said primary switching means, and said supplemental switching means for snapshotting said data on said output and taking a first action when said primary switching means is active but said supplemental switching means is not activated and for taking a superseding second action when said supplemental switching means is activated by a user and said primary switching means is active, said first action comprising interpreting said signal in a first manner, and said second action comprising interpreting said signal in a second manner.

31. The hand-held, dual-mode, two dimensional barcode scanning device of claim 30 wherein:

said first action comprises decoding snapshotted data from said output as two dimensional barcode data.

32. The hand-held, dual-mode, two dimensional barcode scanning device of claim 30 wherein:

said second action comprises decoding snapshotted data from said output as reprogramming data.

33. The hand-held, dual-mode, two dimensional barcode scanning device of claim 30 wherein:

said supplemental switching means is positioned to be activated by a user's thumb/finger.

34. The hand-held, dual-mode, two dimensional barcode scanning device of claim 30 wherein:

a) said supplemental switching means includes a light-sensitive photodiode; and, b) said supplemental switching means is operated by blocking and unblocking a path for light to strike said photodiode.

35. The hand-held, dual-mode, two dimensional barcode scanning device of claim 30 wherein:

a) said supplemental switching means includes an infrared-sensitive detector; and, b) said supplemental switching means is operated by placing and removing a source of infrared energy in a path to strike said infrared-sensitive detector.

36. The hand-held, dual-mode, two dimensional barcode scanning device of claim 31, wherein said second action comprises decoding snapshotted data from said output as reprogramming data.

* * * * *